US009276368B2

(12) United States Patent
Mateo Ferrus et al.

(10) Patent No.: US 9,276,368 B2
(45) Date of Patent: Mar. 1, 2016

(54) TOOL FOR CRIMPING A CONNECTOR

(75) Inventors: Rafael Mateo Ferrus, Barcelona (ES); Longinos De Dios Martin, Barcelona (ES)

(73) Assignee: CommScope Connectivity Spain, S.L. (ES)

( * ) Notice: Subject to any disclaimer, the term of this patent is extended or adjusted under 35 U.S.C. 154(b) by 290 days.

(21) Appl. No.: 13/695,199

(22) PCT Filed: Apr. 18, 2011

(86) PCT No.: PCT/EP2011/056099
§ 371 (c)(1),
(2), (4) Date: Oct. 29, 2012

(87) PCT Pub. No.: WO2011/134813
PCT Pub. Date: Nov. 3, 2011

(65) Prior Publication Data

US 2013/0061470 A1 Mar. 14, 2013

(30) Foreign Application Priority Data

Apr. 29, 2010 (ES) .................................. 201030639

(51) Int. Cl.
*B23P 19/00* (2006.01)
*H01R 43/00* (2006.01)
*H01R 43/042* (2006.01)

(52) U.S. Cl.
CPC ......... *H01R 43/042* (2013.01); *Y10T 29/49181* (2015.01); *Y10T 29/53217* (2015.01)

(58) Field of Classification Search
CPC .. H01R 43/042; H01R 9/0518; H01R 9/0524; H01R 43/048; B30B 1/02
USPC ........ 29/749, 564.4, 593, 705, 729, 747, 750, 29/753, 758, 764
See application file for complete search history.

(56) References Cited

U.S. PATENT DOCUMENTS 3,755,632 A 8/1973 Johnson
4,266,419 A 5/1981 Grundfest
4,467,516 A 8/1984 John et al.
4,627,150 A 12/1986 Burnett (Continued)

FOREIGN PATENT DOCUMENTS

BE 675 187 7/1966
EP 0 162 236 11/1985

(Continued)

OTHER PUBLICATIONS

Spanish Search Report for Application No. 201030639 mailed Apr. 29, 2010.

(Continued)

*Primary Examiner* — Thiem Phan
(74) *Attorney, Agent, or Firm* — Merchant & Gould P.C.

(57) ABSTRACT

A tool for crimping a cable connector (6) comprises a first, U-shaped arm (3) which defines a seat in which the connector (6) may be accommodated in the working position; a second, compression arm (1) suitable for exerting a compression force on the connector (6), comprising a compression profile (5) at one end thereof, which, in turn, comprises a number of rotation pins which project laterally outwards from the compression profile (5) and are suitable for penetrating into corresponding holes in a branch of the first arm (3), to keep the second, compression arm (1) joined to the first arm (3).

18 Claims, 2 Drawing Sheets

(56) References Cited

U.S. PATENT DOCUMENTS

| | | | | |
|---|---|---|---|---|
| 4,700,592 | A | 10/1987 | Rommel | |
| 5,074,142 | A | 12/1991 | Heskey et al. | |
| 5,212,882 | A | 5/1993 | Hamonko et al. | |
| 5,285,163 | A | 2/1994 | Liotta | |
| 5,467,023 | A * | 11/1995 | Takeyama | 324/754.12 |
| 5,624,274 | A | 4/1997 | Lin | |
| 5,720,623 | A | 2/1998 | Polenick et al. | |
| 5,743,131 | A | 4/1998 | Holliday et al. | |
| 5,832,603 | A | 11/1998 | Fallandy | |
| 6,293,004 | B1 * | 9/2001 | Holliday | 29/751 |
| 6,698,090 | B1 | 3/2004 | Hsu | |
| 6,704,992 | B2 | 3/2004 | Minor | |
| 6,820,326 | B1 | 11/2004 | Tarpill et al. | |
| 7,073,245 | B2 | 7/2006 | Alexander et al. | |
| 7,103,968 | B2 | 9/2006 | Karrasch | |
| 7,444,744 | B2 | 11/2008 | Caveney et al. | |
| 7,540,760 | B1 | 6/2009 | Chen | |
| 7,644,485 | B2 | 1/2010 | Muller et al. | |
| 8,839,506 | B2 | 9/2014 | Slater et al. | |
| 2006/0107726 | A1 | 5/2006 | Heggemann et al. | |
| 2006/0230608 | A1 | 10/2006 | Caveney et al. | |
| 2008/0010825 | A1 | 1/2008 | Chawgo | |
| 2008/0313891 | A1 | 12/2008 | Caveney et al. | |
| 2010/0071202 | A1 | 3/2010 | Peng et al. | |
| 2011/0304343 | A1 | 12/2011 | Font Aranega et al. | |

FOREIGN PATENT DOCUMENTS

| | | | |
|---|---|---|---|
| EP | 1 008 209 | B1 | 4/2002 |
| EP | 1 484 824 | | 12/2004 |
| EP | 1 659 663 | | 5/2006 |
| GB | 2457982 | A | 9/2009 |

OTHER PUBLICATIONS

International Search report for International Application No. PCT/EP2011/056099 mailed May 25, 2011.

* cited by examiner

TOOL FOR CRIMPING A CONNECTOR

This application is a National Stage Application of PCT/EP2011/056099, filed 18 Apr. 2011, which claims benefit of Serial No. P201030639, filed 29 Apr. 2010 in Spain and which applications are incorporated herein by reference. To the extent appropriate, a claim of priority is made to each of the above disclosed applications.

FIELD OF THE INVENTION

The present invention relates, in general, to a hand tool for compression crimping a cable connector together with a cable termination.

PRIOR ART

It is known that the operation of terminating a cable comprising a plurality of wires with a connector comprising a plurality of terminals involves the operation of introducing wires one by one into the terminals of the conductor.

American patent application U.S. Pat. No. 6,820,326 B1, incorporated herein by reference, discloses a hand tool for crimping a cable connector to a cable terminal which includes a first working arm, a second working arm supported in orientable manner by means of a first rotation shaft and a plunger likewise supported in orientable manner by means of a second rotation shaft, such that the plunger is adjustable in a window in the second working arm as a function of the size of the connector which it is desired to mount.

The current prior art is associated at least with the disadvantages of bulkiness of the hand tool, which may limit the places in which said tool may be used, and the structural complexity inherent in the use of a number of components, including small parts, which increases the cost of the hand tool.

SUMMARY OF THE INVENTION

The present invention seeks to eliminate or diminish one or more of the above-mentioned drawbacks by means of a tool for crimping a connector to a cable termination as defined in the claims.

In one embodiment the crimping tool comprises a first, U-shaped arm which defines a seat in which, in the working position, a cable connector may be accommodated in lateral butt contact with a lateral branch of the first arm, to prevent the cable connector from moving sideways under the action of the compression exerted on the connector by a compression profile of a second, pressing arm when the latter is turned about a number of lateral rotation pins which are inserted into corresponding holes in the opposite lateral branch from the branch of the first, U-shaped arm in butt contact with the connector to be crimped.

The compression profile or cam of the second, pressing arm may be described as being situated around the projecting rotation pins, which form the rotation shaft of the second arm, the dimension and shape of which is a function of the size or dimension of the cable connector introduced into the seat of the first, U-shaped arm, such that when the crimping tool is actuated, that is to say the second arm is turned about its rotation pins from a maximally open working position towards a closed working position, the compression profile exerts uniform pressure on the cable terminals and the connector to crimp the latter.

This compression profile or cam is in direct contact with the connector, without any component being interposed between the two. When the arm is closed, the cam or compression profile exerts pressure on the connector, compressing it and effecting crimping of the cable. The purpose of the cam or compression profile is gradually to reduce the distance between the connector located in the seat and the cable terminal, such that the force needed for crimping is always small and of the same absolute, constant value.

With this structure and assembly, simply turning the second, pressing arm about the rotation shaft automatically compresses the cable terminals against the connector, that is to say, the pressure exerted by the compression profile is independent of the skill of the operator using the crimping tool.

Second, pressing arms with pressing profiles of different physical dimensions and/or shapes may be joined to the first arm by means of its corresponding projecting rotation pins.

Each type of second, pressing arm is related to the physical dimensions of the connector which it is desired to crimp, such that, as a function of the type of second, pressing arm assembled with the first arm using the projecting rotation pins, a predetermined displacement and pressure force may be achieved when the second, pressing arm is turned about the rotation shaft.

Each branch of the first, U-shaped arm comprises a hole into which the rotation pins may be inserted which serve to join the second, pressing arm to the first, U-shaped arm.

The relative distance between the level of the seat in the first, U-shaped arm and the level of the insertion hole in each of the branches of the first arm allows different displacements and compression forces to be brought about, such that the line of displacement of the connector is always the same and the compression force is always applied at the same point of the connector which it is desired to crimp.

The axis of the second arm and the pressure point may be situated approximately in the central plane of the conductor to prevent or reduce tangential forces on the connector.

In accordance with the above, a process may be defined for terminating a cable comprising a plurality of wires with a connector having a plurality of terminals using the crimping tool which comprises the steps of accommodating a connector in a seat in a first, U-shaped arm; accommodating a cable terminal in a receptacle defined at one end of the seat in the first arm; and pressing the connector against the cable terminal by means of a compression profile included at one end of a second, pressing arm, such that the connector is moved towards the termination position, the terminals thereby being brought into contact with the wires.

The end at which the compression profile of the second arm is located may be connected to a corresponding end of the first, U-shaped arm.

In turn, while the crimping tool is strictly speaking performing the crimping function, a portion of the external insulation is removed from the cable to reveal the insulated wires inside; the insulated wires being positioned with positioning means and lined up with a number of supporting means; alignment of the connector with the support means by lining up the guide means of the support means with a surface complementary to the connector; cutting of the surplus ends of the wires which extend beyond the terminals with cutting means connected to the support means; and removing the support means from the cable terminated with the connector.

BRIEF DESCRIPTION OF THE DRAWINGS

A more detailed explanation of devices and/or methods in accordance with embodiments of the invention may be found in the following description, which makes reference to the appended figures, in which.

DESCRIPTION OF PREFERRED EMBODIMENTS

Figure 1:
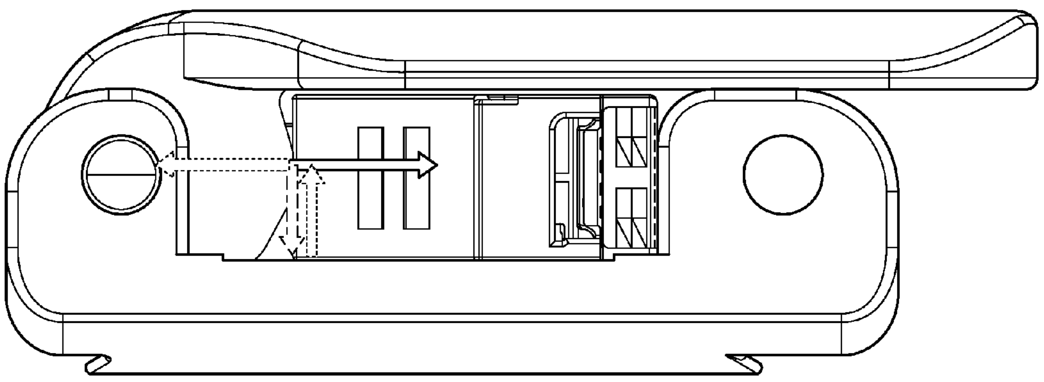
FIG. 1 is a perspective view of a connecting tool in the closed working position in which a terminated connector is accommodated in the seat in the connecting tool.
Figure 2:
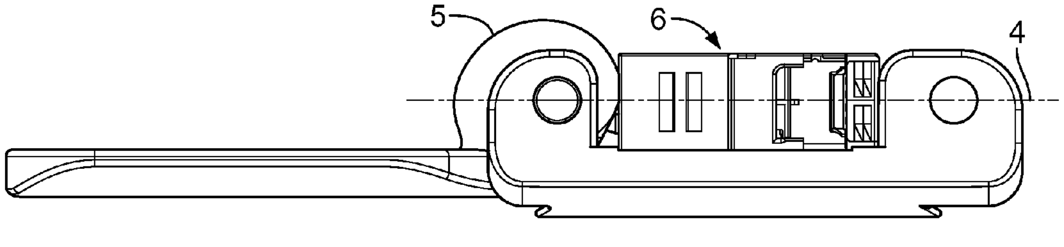
FIG. 2 is a perspective view of the connecting tool in the maximally open working position.
Figure 3:
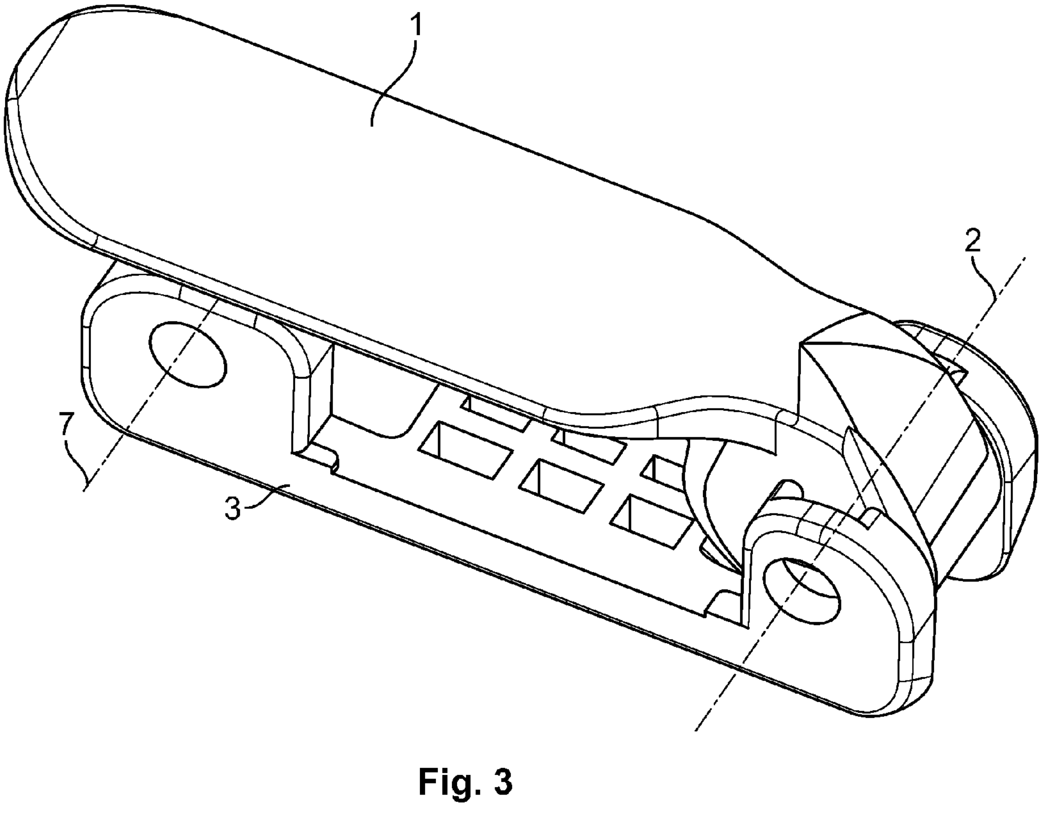
FIG. 3 is a lateral perspective view of the connecting tool in the closed working position.

According to FIGS. 1, 2 and 3, a tool for crimping a cable comprising a plurality of wires to a connector comprising a plurality of terminals, involving the operation of introducing wires one by one into the terminals of the conductor, comprises a first, U-shaped arm 3 which defines a seat in which, in the working position, a cable connector 6 may be accommodated in butt contact with a lateral branch of the first arm; a second, pressing arm 1 includes a pressing profile 5 at one end thereof and a number of lateral rotation pins which project outwards from the pressing profile 5 to penetrate into corresponding holes in a branch of the first, U-shaped arm 3, to keep the second, pressing arm 1 joined to the first arm 3.

The pressing profile 5 or cam of the second, pressing arm 1 is situated around the projecting lateral rotation pins, which form a rotation shaft 2, 7 for the second arm 1.

The rotation shaft 2, 7 may be located in a horizontal plane 4 parallel to the seat in the first arm 3, which plane divides the connector 6 to be crimped into two parts.

The dimensions and shape of the compression profile 5 of the second, pressing arm 1 is a function of the size or dimension of the cable connector introduced into the seat in the first, U-shaped arm 3, such that when the connecting tool is actuated, that is to say the second arm 1 is turned about its rotation pins from a maximally open working position towards a closed working position, the compression profile 5 exerts uniform and constant pressure on the cable terminals and the connector to crimp the latter.

With this structure and assembly, simply turning the second, pressing arm 1 about the rotation shaft automatically compresses the cable terminals against the connector, that is to say the pressure exerted by the compression profile 5 is independent of the skill of the operator using the connecting tool.

Second, pressing arms 1 with pressing profiles of different physical dimensions and/or shapes may be joined to the first arm 3 by means of the rotation shaft 2, 7.

Each type of second, pressing arm 1 is related to the physical dimensions of the connector 6 to be crimped, such that, as a function of the type of second, pressing arm 1 assembled with the first arm 3 by means of the rotation shaft 2, 7, a predetermined displacement and pressure force may be achieved when the second, pressing arm 1 is turned about the same.

Each branch of the first, U-shaped arm 3 comprises a hole into which the rotation shaft 2, 7 may be inserted which serves to join the second, pressing arm 1 to the first, U-shaped arm 3.

The relative distance between the level of the seat in the first, U-shaped arm 3 and the level of the hole in each of the branches of the first arm 3 allows different displacements and pressure forces to be brought about, such that the line of displacement is always the same and the compression force is always applied at the same point of the connector 6 which it is desired to crimp.

The connector 6 to be crimped is prevented from moving by the effect of the compression exerted on the connector 6 by the compression profile 5 when the latter is turned about the rotation shaft 2, 7 due to being in butt contact with the opposite branch from the branch of the first arm 3 into which the second arm 3 of the crimping tool is inserted.

The invention claimed is:

1. A tool for crimping a cable terminal together with a connector, the cable terminal including a plurality of wires, and the connector including a plurality of terminals; the plurality of wires of the cable terminal being introduced one by one into the plurality of terminals of the connector; the tool comprising: a first arm which defines a seat in which the connector is accommodated in the working position; a second, compression, arm suitable for exerting a uniform compression force on the connector; the second, compression, arm including a pressing profile at one end thereof, which, in turn, comprises two rotation pins which project laterally outwards from the pressing profile, and penetrate into corresponding holes in a branch of the first arm to keep the second, compression, arm joined to the first arm, the rotation pins forming a rotation shaft for the second, compression, arm; a single horizontal plane extending through the rotation shaft and the pressing profile in a moving direction of the connector; the pressing profile having a curved shape for exerting the uniform compression force on the connector while remaining in the single horizontal plane of the connector throughout an entire rotation of the second, compression, arm to crimp the cable terminal and the connector together, the cable terminal and the connector being removable from the seat of the first arm of the tool as one unit.

2. The tool according to claim 1, wherein the first arm comprises holes in both U-shaped branches suitable for receiving the rotation pins in either of the branches of the first arm.

3. The tool according to claim 1, wherein the physical dimensions of the pressing profile of the second, compression, arm are adapted to the type of connector to be crimped.

4. The tool according to claim 1, wherein the second, compression, arm has a first length that extends beyond a length of the first arm when in a closed working position.

5. The tool according to claim 1, wherein the rotation shaft is located in a horizontal plane parallel to the seat of the first arm.

6. The tool according to claim 1, wherein the pressing profile is shaped to provide constant contact with the connector in the single horizontal plane as the second, compression, arm is rotated.

7. The tool according to claim 1, wherein the first arm has U-shaped configuration.

8. A tool for crimping a cable comprising:

a first arm having a base, the base defining a seat for receiving a connector and a cable terminal that are crimped together therein;

a second, compression, arm adapted to exert a compression force on the connector, the second, compression, arm including a pressing profile at one end thereof, the pressing profile having rotation pins that project laterally outwards from opposing sides of the pressing profile, the rotation pins forming a rotation shaft for the second, compression, arm, a single horizontal plane extending through the rotation shaft and the pressing profile parallel to a forward direction of the connector, the pressing profile having a curved shape for exerting a uniform compression force on the connector while remaining in the single horizontal plane of the connector throughout an entire rotation of the second, compression, arm to crimp the cable terminal and the connector together, the cable terminal and the connector being removable from the seat of the first arm of the tool as one unit.

9. The tool according to claim 8, wherein the second, compression, arm has a first length that extends beyond a length of the first arm when in a closed working position.

10. The tool according to claim 8, wherein the rotation shaft is located in a horizontal plane parallel to the seat of the first arm.

11. The tool according to claim 8, wherein the pressing profile is shaped to provide constant contact to the connector while the second, compression, arm is rotated from an open working position towards a closed working position.

12. The tool according to claim 8, wherein the pressing profile is shaped to provide constant contact with the connector being crimped as the second, compression, arm is rotated.

13. A tool for crimping a cable comprising:

a base having a first branch end and a second branch end opposite the first branch end, the base defining an opening at the first branch end to form two opposing post defining apertures therein, the base having a longitudinal axis between the first and second branch ends;

a lever pivotally connected to the base and having a pressing profile for exerting a uniform compression force on a connector and against the second branch end of the base;

rotation pins mounted transversely to the longitudinal axis of the base, the rotation pins forming a pivot shaft for pivotally mounting the lever, the rotation pins engaging the apertures of the two opposing posts for mounting the lever to the base;

a seat defined by the base between the first and second branch ends, the seat having a connector that is longitudinally translatably guided in the seat toward a cable terminal upon the pressing profile of the lever when the lever is rotated from an open working position towards a closed working position; and a single horizontal plane extending through the pivot shaft and the pressing profile parallel to a forward direction of the connector, the pressing profile having a curved shape for exerting the uniform compression force on the connector while remaining in the single horizontal plane of the connector throughout an entire rotation of the lever to crimp the cable terminal and the connector together, the cable terminal and the connector being removable from the seat of the base of the tool as one unit.

14. The tool according to claim 13, wherein the rotation pins projects outwardly from opposing sides of the pressing profile.

15. The tool according to claim 13, wherein the two opposing posts each define a recess gap at a top surface of the two opposing posts.

16. The tool according to claim 13, wherein the pressing profile is shaped to provide constant contact with the connector being crimped as the lever is rotated.

17. The tool according to claim 13, wherein the lever has a first length that extends beyond a length of the base when in the closed working position.

18. The tool according to claim 13, wherein the pivot shaft is located in a horizontal plane parallel to the seat of the base.

* * * * *